United States Patent [19]

Nemirovsky et al.

[11] Patent Number: 5,079,760

[45] Date of Patent: Jan. 7, 1992

[54] METHOD FOR EFFICIENT DISTRIBUTED DATA COMMUNICATIONS NETWORK ACCESS NETWORK CONFIGURATION

[76] Inventors: Paul Nemirovsky, 3 Bouldercrest Ct., Rockville, Md. 20850; Michael Ball, 1012 S. Mansion Dr., Silver Spring; Roy Dahl, 8152 Mandan Ter., Greenbelt, both of Md. 20770

[21] Appl. No.: 475,886

[22] Filed: Feb. 6, 1990

[51] Int. Cl.$^5$ .............................................. H04J 15/00
[52] U.S. Cl. ......................................... 370/17; 370/56
[58] Field of Search ................... 370/13, 17, 56, 58.1, 370/60, 60.1, 94.1, 94.3

[56] References Cited

U.S. PATENT DOCUMENTS

4,974,224 11/1990 Boone ................................. 370/94.1

Primary Examiner—Douglas W. Olms
Assistant Examiner—Melvin Marcelo
Attorney, Agent, or Firm—Kenyon & Kenyon

[57] ABSTRACT

A method for locating and selecting concentrators and local access links in a distributed data network in the most cost-efficient way is disclosed. The method first identifies a median concentrator from among a set of candidate concentrators to which all of the data terminals are initially assigned. The method then iteratively evaluates and adds to the network those concentrators which produce savings in the network's cost. The method first adds all of a set of concentrators specified to be mandatory and then adds from among a set of candidate concentrators those which produce cost savings. The method then evaluates concentrators in the network and removes those concentrators whose removal produces savings in the network cost.

8 Claims, 10 Drawing Sheets

|  |  |  | Backbone Sites |  |  | T1 Site |  | v2.2 |  |
|---|---|---|---|---|---|---|---|---|---|
| Loc ID | Dev | Node Num. | Cost | Avail | Exist | Chosen? Y/N | Chos? Y/N | Node Num | Switch ID | Number of Increments Pack Line |
| ALMONT | BB | 5 | 4000.00 | O | N | N |  | BB |  |
| CALANG | BB | 8 | 4000.00 | O | N | N |  | BB |  |
| CAOAKL | BB | 7 | 4000.00 | O | N | N |  | BB |  |
| COAURO | BB | 6 | 4000.00 | O | N | N |  | BB |  |
| ILCHIC | BB | 4 | 4000.00 | O | N | N |  | BB |  |
| MABOST | BB | 0 | 4000.00 | M | N | N |  | BB |  |
| NJTREN | BB | 1 | 4000.00 | O | N | N |  | BB |  |
| OHCINC | BB | 3 | 4000.00 | O | N | N |  | BB |  |
| VARICH | BB | 2 | 4000.00 | O | N | N |  | BB |  |

Design Switches: PageDown Key

Count: *9

FIG. 4A

```
-----------------------------Concentrators-----------------------v2.0-
                 Chosen  Switch  Switch         Avail    Exist
Loc ID  Dev  ID Node #  Node #  Type    Cost    (O.M)    Y/N
ARLROC  LS          2            S      700.00    0       N
CALANG  LS         19            S      700.00    0       N
CAOAKL  LS          6            S      700.00    0       N
COAURO  LS          3            S      700.00    0       N
DCWASH  LS         13            S      700.00    0       N
FLTAMP  LS          4            S      700.00    0       N
GAATLA  LS          1            S      700.00    0       N
ILCHIC  LS         15            S      700.00    0       N
ILSPRI  LS         17            S      700.00    0       N
KYLOUI  LS         16            S      700.00    0       N
LABROU  LS          5            S      700.00    0       N
MABOST  LS          9            S      700.00    0       N
MOKCIT  LS         21            S      700.00    0       N
NCCHAR  LS         20            S      700.00    0       N Average Computed Bytes per Packet (Profile 0):            65

Design Concentrators:    PageDown Key

Char Mode:  Replace  Page 1                       Count:  14
```

FIG. 4B

―――――Terminal/Host Clusters――――― v2.0

| Cluster No. | Design ID | V Coord | H Coord | Cluster Weight |
|---|---|---|---|---|

―――――Design Locations――――― v2.0

| Clust# | Loc ID | V Coord | H Coord | Lata | St | Vir | Term | T/H Flag: | Conc | BackB |
|---|---|---|---|---|---|---|---|---|---|---|
| 0 | ALBIRM | 7518 | 2446 | 476 | AL | | 0 | Y | 0 | 0 |
| 0 | ALMONT | 7692 | 2247 | 478 | AL | | 0 | Y | 0 | 0 |
| 0 | ARLROC | 7721 | 3448 | 528 | AR | | 0 | Y | 0 | 0 |
| 0 | AZPHOE | 9133 | 6748 | 666 | AZ | | 0 | Y | 0 | 0 |
| 0 | AZTUCS | 9347 | 6469 | 668 | AZ | | 0 | Y | 0 | 0 |
| 0 | CAFRES | 8669 | 8239 | 728 | CA | | 0 | Y | 0 | 0 |

―――――Terminal/Host Traffic――――― v2.0

| Source: Loc ID | Dev ID | Dest: Loc ID | Dev ID | Peak Byte | Profile ID |
|---|---|---|---|---|---|
| ALBIRM | T | CALANG | H | 61.5 | 1 |
| ALBIRM | T | DCWASH | H | 61.5 | 1 |
| ALMONT | T | CALANG | H | 209.6 | 1 |

Enter in peak byte traffic.  
Char Mode:  Replace    Page 1                               Count: 3

FIG. 5

```
┌─────────────────────────Chosen Concentrators─────────────────────────v2.0─┐
│        Dev  Node Chos                    Avail Exist Prob    Delay  #     Load    │
│ Loc ID ID Type #    #   Cost $     FS  (O.M)  Y/N   To BB    To BB  Lines (bytes) │
│ ARLROC LS  S   2    2   700.00     Y     O     N   .989604  .10205  16    1529    │
│ CALANG LS  S  21   11   700.00     Y     O     N   .9702    .01258   8    2281    │
│ CAOAKL LS  S   6    4   700.00     Y     O     N   .9702    .01278  13    2688    │
│ COAURO LS  S   3    3   700.00     Y     O     N   .9702    .0126   10    2447    │
│ GAATLA LS  S   1    1   700.00     Y     O     N   .989604  .1292   16    2612    │
│ ILCHIC LS  S  17    9   700.00     Y     O     N   .989604  .14495   8    2551    │
│ KYLOUI LS  S  18   10   700.00     Y     O     N   .9702    .09005   4     652    │
│ NEOMAH LS  S   0    0   700.00     Y     O     N   .989604  .08186   6    1107    │
│ NJTREN LS  S  13    7   700.00     Y     M     N   .989604  .01465  27    7721    │
│ NYSYRA LS  S  12    6   700.00     Y     O     N   .9702    .14061   9     986    │
│ OHCINC CN  B   9    5   450.00     Y     O     N   .9702    .01571   4     756    │
│ OHTOLE LS  S  16    8   700.00     Y     O     N   .9702    .08112   5     544    │
│                                                                           │
│     Average Computed Bytes per Packet (Profile 0):        65              │
│    ┌────────────────────────────────────────────────┐                     │
│    │ Design Concentrators:   PageDown Key           │                     │
└────┴────────────────────────────────────────────────┴─────────────────────┘

Char Mode: Replace    Page 1                        Count: *12
```

FIG. 7

─────────Local Access Links─────────────────────────────────────v2.0──

| Source Loc ID Dv | Destin Loc ID Dv | Speed Kb/Sec | Cost | Chos?/Feas? | Avail | Prop Delay # of Links | | SD= DS= | Traffic Flow | Link Delay |
|---|---|---|---|---|---|---|---|---|---|---|
| ALBIRM T | ARLROC LS | 19.2 | 2009.33 | N | .98 | 0 | 0 | SD= DS= | | |
| ALBIRM T | GAATLA LS | 19.2 | 1446.02 | Y | .98 | 0 | 1 | | .1 .39 | .02722 .02765 |
| ALBIRM T | KYLOUI LS | 19.2 | 2145.58 | N | .98 | 0 | 0 | | | |
| ALMONT T | GAATLA LS | 19.2 | 1463.22 | Y | .98 | 0 | 1 | | .34 1.34 | .02756 .02912 |
| ARLROC LS | CALANG BB | 9.6 | 979.03 | N | .98 | 0 | 0 | | | |
| ARLROC LS | CAOAKL BB | 9.6 | 1042.67 | N | .98 | 0 | 0 | | | |
| ARLROC LS | COAURO BB | 9.6 | 845.83 | N | .98 | 0 | 0 | | | |
| ARLROC LS | OHCINC BB | 9.6 | 688.65 | Y | .98 | 0 | 2 | | 2.45 9.79 | .06208 .11047 |

Char Mode: Replace   Page 1                             Count: 9

FIG. 8

———Backbone Traffic and End to End Availability———v2.0

| Loc ID | Source Device | Node # | Loc ID | Destination Device | Node # | Peak Byte |
|---|---|---|---|---|---|---|
| CALANG | BB | 4 | CALANG | BB | 4 | 116.65 |
| CALANG | BB | 4 | CAOAKI | BB | 3 | 63.58 |
| CALANG | BB | 4 | COAURO | BB | 2 | 151.96 |
| CALANG | BB | 4 | NJTREN | BB | 0 | 589.64 |
| CALANG | BB | 4 | OHCINC | BB | 1 | 548.73 |
| CAOAKL | BB | 3 | CALANG | BB | 4 | 98.77 |
| CAOAKL | BB | 3 | CAOAKL | BB | 3 | 193 |
| CAOAKL | BB | 3 | COAURO | BB | 2 | 102.19 |
| CAOAKL | BB | 3 | NJTREN | BB | 0 | 470.82 |
| CAOAKL | BB | 3 | OHCINC | BB | 1 | 408.22 |
| COAURO | BB | 2 | CALANG | BB | 4 | 37.99 |
| COAURO | BB | 2 | CAOAKL | BB | 3 | 183.01 |
| COAURO | BB | 2 | COAURO | BB | 2 | 173.25 |
| COAURO | BB | 2 | NJTREN | BB | 0 | 368.34 |
| COAURO | BB | 2 | OHCINC | BB | 1 | 654.69 |
| NJTREN | BB | 0 | CALANG | BB | 4 | 368.96 |
| NJTREN | BB | 0 | CAOAKL | BB | 3 | 798.18 |
| NJTREN | BB | 0 | COAURO | BB | 2 | 317.91 |

Char Mode: Replace    Page 1    Count: 18

FIG. 9

METHOD FOR EFFICIENT DISTRIBUTED DATA COMMUNICATIONS NETWORK ACCESS NETWORK CONFIGURATION

FIELD OF THE INVENTION

This invention relates generally to distributed data communication networks and, more specifically, to a method for the most cost-efficient location and selection of concentrators and local access links in a distributed data network.

BACKGROUND OF THE INVENTION

The design of distributed data network topologies has been practiced for many years. The need for a comprehensive method for constructing a distributed data communication network results from the complexity of such a system. A distributed data communication network is a hierarchical system of hardware components arranged to connect each hardware device, directly or indirectly, to every other device. At the lowest level in the hierarchy are user terminals or host devices, which form part of the local access network. These terminals are linked to one or more concentrators, which are statistical multiplexers with several low data rate input data lines and fewer high data rate output data lines. The concentrators form the second level of the network hierarchy and, together with the terminals, form the local access network.

The concentrators, which may be connected to other concentrators in a hierarchical fashion, are ultimately connected to the backbone, which forms the highest level in the network hierarchy. The backbone consists of high data capacity lines that terminate at backbone nodes. A backbone node consists of one or more devices including a switching device for routing traffic within the backbone. Data traffic from the concentrators enters the backbone at the backbone nodes.

Systems for constructing the most efficient location and selection of concentrators in the network have been so generic as not to accommodate all of the parameters typically used in the communications industry. Other approaches have been so narrowly focused so as to render the system relatively inflexible. The invention described herein overcomes the deficiencies with a system that permits greater facility for arriving at a particular node construction. Although certain assumptions are made with respect to local access cost and node capacity, the user is given great flexibility in varying many other parameters which control the local access network construction. The invention includes several unique features not found in existing methods for locating and selecting concentrators and local access links. The invention integrates switching and transmission capacity limitations into the optimization process. It is capable of integration into a global network optimization mechanism. It has the capability to incorporate both mandatory and optional locations and the flexibility to address a variety of local access scenarios. Further, it has the ability to handle multiple communications protocols. Finally, it produces detailed and accurate switching costs, considering such factors as the number of ports, data throughput, and types of communications protocols used.

SUMMARY OF THE INVENTION

The present invention is directed to a method used to locate and select concentrators and local access links in a distributed data network that overcomes the limitations of the prior art. More specifically, the invention is composed of a personal computer-based software tool used to aid in the location and selection of concentrators and local access links in distributed data communication networks that make use of equipment provided by Telenet Communications Corporation as well as similar equipment from other vendors. These networks include the Telenet Public Data Network, private networks that employ Telenet equipment, and hybrid networks that contain both privately-owned components and public data network equipment.

The invention selects a set of concentrator and local access link locations and types to meet performance requirements in the least-cost manner. It uses as inputs candidate concentrator locations and types, data terminal locations, data traffic between those terminals, terminal requirements for ports, and locations of backbone nodes. The user can constrain the operation of the method by specifying mandatory locations for concentrators, limiting the type of concentrator which can be used at any location, and specifying terminals to be associated with any concentrator. The invention also evaluates performance characteristics of the local access network and alerts the user to any aspects of the local access network configuration which renders it infeasible.

The above is a brief discussion of some of the prior art and features of the invention. Other advantages of the invention can be gleaned from the detailed discussion of the preferred embodiment that follows.

DETAILED DESCRIPTION OF THE PREFERRED EMBODIMENT

Figure 1:
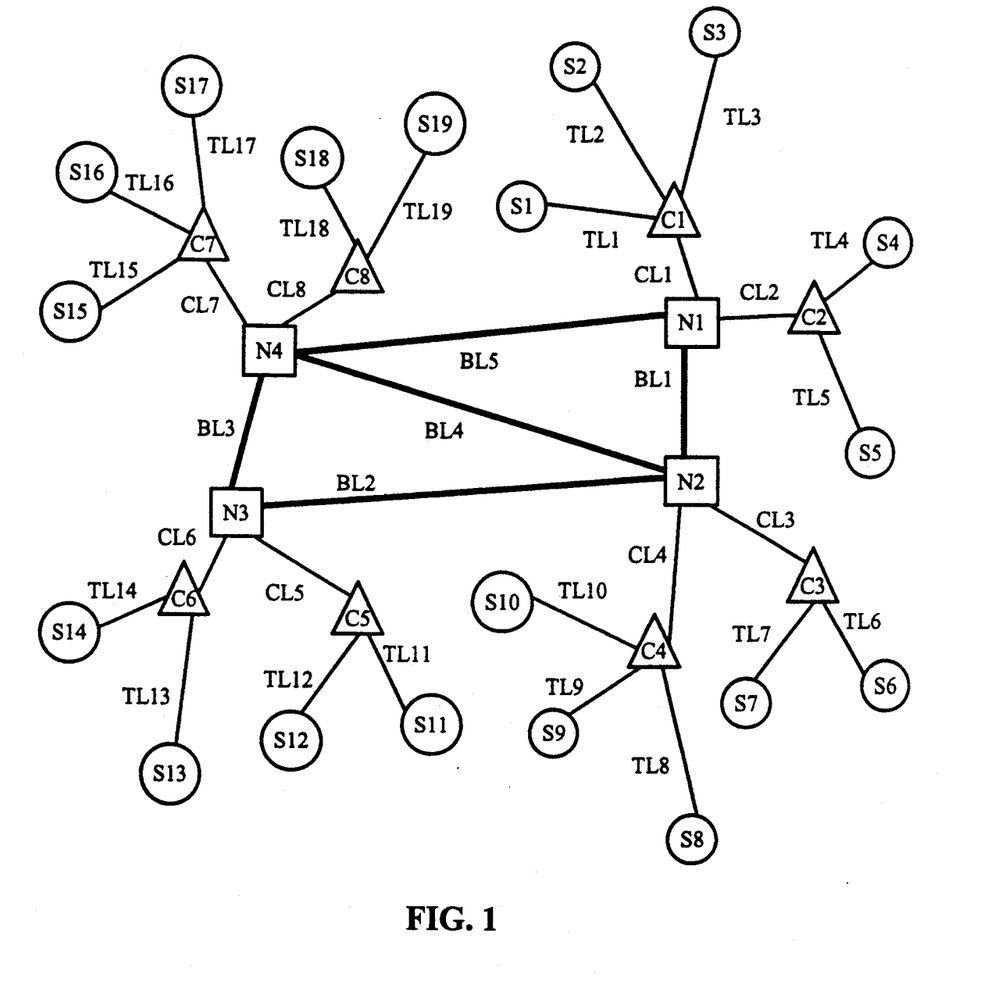
FIG. 1 is a diagram depicting a distributed data communications network comprising terminals, concentrators, and backbone nodes and the data line links connecting those devices.

In describing an illustrative embodiment, it is helpful in conveying the principles of the present invention to consider the specific network depicted in FIG. 1. Although this network is less complex than those encountered in practice, the small size of the network allows for brevity of description without loss of generality. The network consists of a set of interconnected data terminals $S_1$-$S_{19}$; a variety of data terminals can be used. The terminals are connected to concentrators $C_1$-$C_8$ which are statistical multiplexers such as one of the Telenet Communications Corporation model number TP 3000 series multiplexers. The concentrators are in turn connected to backbone nodes $N_1$ to $N_4$; the backbone nodes contain data switches such as a Telenet Communications Corporation TP4/III series switch.

The links $TL_1$-$TL_{19}$ between the terminals and the concentrators are data lines leased from local telephone service providers, as are the links $CL_1$-$CL_8$ between the concentrators and backbone nodes. The backbone nodes are connected by backbone data link lines $BL_1$-$BL_5$, which are high-volume leased data lines such as T1 fiber optic lines leased from a long-distance telephone service provider such as U.S. Sprint. The backbone nodes N and the backbone links BL collectively form the backbone of the data communications network. The terminals S, concentrators C, and data links TL and CL collectively form the local access network. Data is transmitted between the terminals S through the backbone and the local access network. The amount of data which flows per unit time through the network from one terminal to another terminal is the traffic volume T between the terminals.

The cost of establishing the network shown in FIG. 1 can be divided into the cost of the backbone and the cost of the local access network. The cost of the backbone includes the cost of the switches located at the backbone nodes and the costs of the backbone links BL. The cost of the local access network consists of the cost of concentrators C and data links TL and CL. The invention is a method for determining that set of concentrator locations, concentrator types, and link configurations which will give the lowest local access network costs based on a set of backbone node locations N, candidate concentrator locations CC, terminals S, traffic volumes T for those terminals, and requirements for the number of data ports (sites to which data lines can be connected) for each terminal.

The hardware components shown schematically in FIG. 1 can represent a variety of hardware devices. Each terminal $S_i$ can also represent a virtual terminal composed of an aggregate of more than one physical terminal or may represent a concentrator in a network with two levels of concentrators. In general, a single physical location may have more than one hardware device. Similarly, a backbone node $N_i$ can consist of multiple switches. The links CL, TL, and BL can be different types of data lines. A concentrator can be a local switch or a true concentrator, and can be placed at the same location as a backbone node.

To configure the local access network, the locations of the backbone nodes and the terminals, the traffic volume between the terminals, the number of ports required by each terminal, and the possible locations of concentrators must be known. Each terminal or backbone node location can be a potential concentrator location, specified either as an optional site CO or as a mandatory site CM. The locations of the terminals and the backbone nodes in the network can be fixed in a two-axis coordinate system by specifying their locations in standard AT&T V,H coordinates or as area code/exchange locations. The traffic volumes between the terminals can be specified in the user-selected form of bytes/second, packets/second, or calls/second. The traffic from terminal $S_i$ to terminal $S_j$ is $T_{ij}$.

Figure 2:
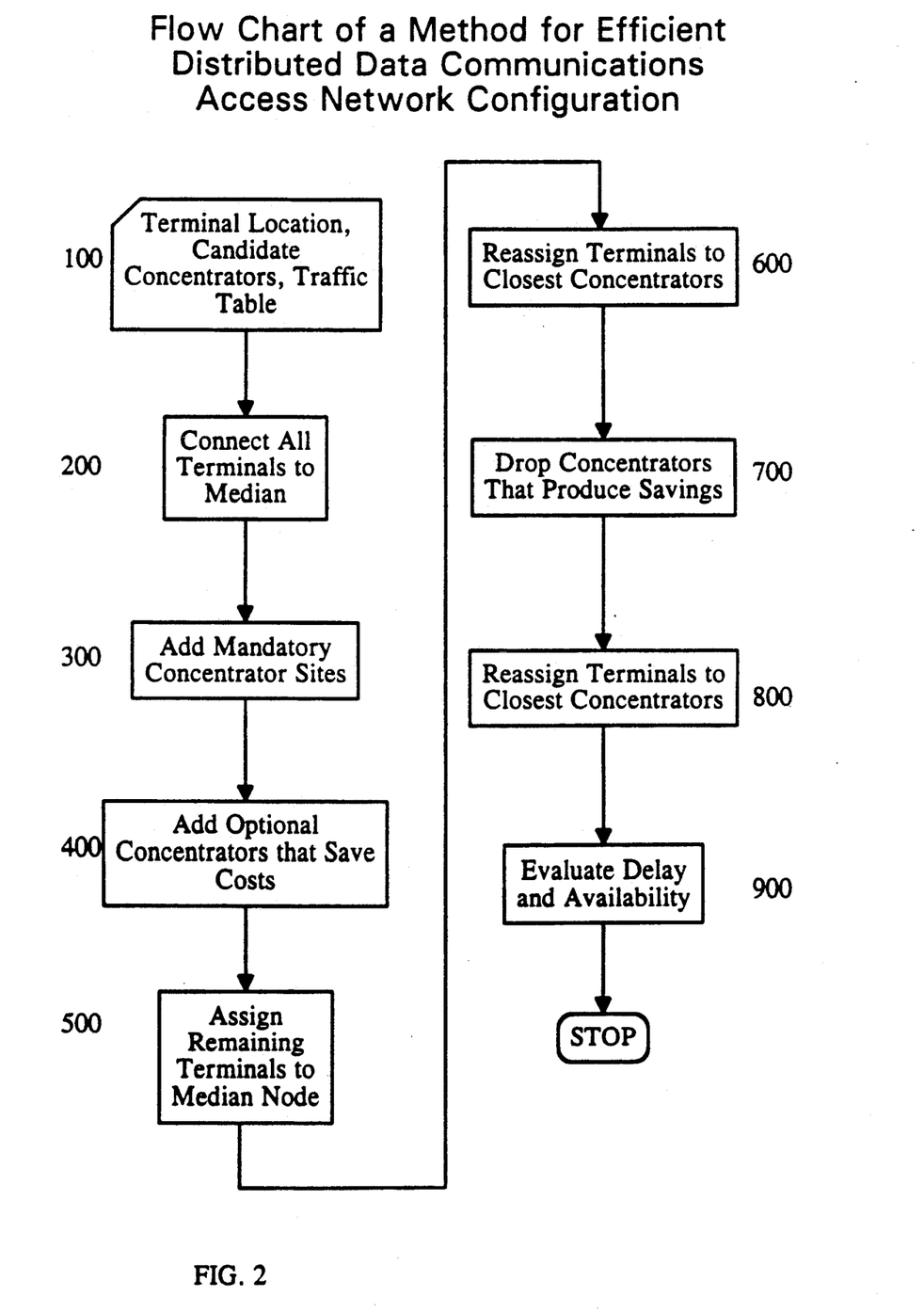
FIG. 2 is a flow chart diagram of the steps of the invention.

The logical flow of the method is illustrated schematically in FIG. 2. In the first step 100 the required input information is supplied. The method then proceeds in an incremental fashion. At each stage of the local access network configuration process, each terminal $S_i$ is associated with one of the concentrators already selected. Initially, as shown in step 200 of FIG. 2, all terminals are connected directly to a default, or median, concentrator candidate. This median candidate is the candidate concentrator location at which a concentrator type can be placed which will handle the traffic for the largest terminal, which permits the placement of enough concentrators to handle the data traffic from all terminals, and which minimizes the estimated cost for that configuration. The estimated cost is the sum of the cost of the terminal-to-concentrator link, TL, costs and the cost of concentrator hardware required to handle all of the terminals $s_i$.

The next phase of the method is an add phase, in which concentrators are added to the local access network. As shown in step 300 of FIG. 2, in the first step of this add phase, terminals $S_i$ are assigned to all of the mandatory concentrators sites CM. This is an iterative process in which the method adds to the local access network, and assigns terminals to, that concentrator which maximizes the savings achieved by reassigning terminals to it rather than to the concentrators to which those terminals are already assigned.

The savings $SAV_i$ associated with adding a mandatory concentrator site $CM_i$ can be expressed as:

$$SAV_i = ST_i - CC_i$$

where $ST_i$ is the savings in terminal-to-concentrator link costs and $CC_i$ is the cost of the concentrator hardware. $ST_i$ is the cost of the TL links used to connect to the concentrator being evaluated those terminals which would be assigned to the concentrator less the cost of the TL links connecting those terminals to the concentrators to which they are already assigned. The cost of the TL links between each terminal and the concentrator is the product of the cost of an individual line and the number of lines specified for the terminal. The cost of an individual line is based on the exact or approximate cost of leasing a direct line from a telephone service provider to connect the terminal location to the node location. The cost of leasing the line from the service provider is determined from the standardized tariff that the provider charges to supply a line of the required data-carrying capacity over the required distance. The cost of the concentrator hardware includes the cheapest cost of a CL link between the concentrator and a backbone node N, if the concentrator is not co-located with a backbone node. The method repeats this process for the remaining mandatory concentrator sites CM, adding the most cost-effective site in each iteration, until all of the mandatory sites have been added to the network.

In the next step of the add phase of the method, shown in step 400 of FIG. 2, the optional concentrator sites CO are evaluated. In each iteration of this evaluation, the one optional site which, if added, would produce the greatest savings $SAV_i$ by its addition to the local access network, is added to the network. This process is repeated until there are no optional concentrator sites $CO_i$ which would produce positive savings $SAV_i$. Any terminals which have not been reassigned to one of the mandatory or optional concentrator sites are assigned to the median concentrator, as shown in step 500 of FIG. 2.

In the previous steps, multiple terminal reassignments may have resulted in some concentrators having excess capacity. Therefore, in the final step of the add phase, as shown in step 600 of FIG. 2, terminals are again reassigned. Since the telephone service providers' tariffs are generally monotonically increasing as a function of distance, the method assumes that positive savings will always result from assigning a terminal to the concentrator which is physically closest to the terminal. This step therefore reassigns each terminal to the physically closest concentrator.

The next phase in the method of the invention is an iterative drop phase. In the first step of this drop phase, as shown in step 700 of FIG. 2, the same calculations are made as in step 400 of the add phase except that the method considers whether the removal of a concentrator could produce positive overall savings. It is possible that dropping a previously added concentrator could produce cost savings because the added concentrator may have had some of its associated terminals reassigned to later-added concentrators such that its remaining terminals are more cheaply assigned to other concentrators. The method drops the concentrator which produces the greatest savings by being dropped and reassigns its terminals. The process is repeated until no savings are achieved by dropping a concentrator. In the second step of the drop phase, as shown in step 800 of FIG. 2, terminals are again reassigned, as at the end of the add phase.

The sequence of steps described above is followed once in each of two phases—Phase I and Phase II. In Phase I, the method considers only those concentrator candidates which are either local switches or are true concentrators not co-located with backbone nodes (provided that they are either mandatory or optional concentrators). The results of Phase I are used in Phase II. If there are no true concentrators not co-located with backbone nodes, Phase II is omitted. Otherwise, all local switches (whether optional or mandatory concentrator candidates) selected in Phase I become mandatory concentrators in Phase II, while those local switches not selected in Phase I are not considered in Phase II. True concentrators retain their characteristics as optional or mandatory in both Phase I and Phase II. The costs associated with concentrators also differ between the two phases. In Phase II, the cost $CC_i$ of adding a concentrator to the local access differentiates between local switches and true concentrators. For those local switches chosen in Phase I, the cost is zero, while for true concentrators, the cost is the actual cost of the concentrator plus the cost of the backbone (whether directly or through an associated local switch). If the concentrator is co-located with a backbone node, the connection cost to the backbone is zero, which correctly reflects the fact that there are no transmission costs.

After configuring the local access network, the method evaluates performance characteristics of the network, as shown in Step 900 of FIG. 2. In addition to providing a performance summary of the network, the method will determine whether the selected configuration is capable of handling the specified traffic. Although the method will always configure a network capable of handling the traffic, constraints imposed by the user, such as fixing link line speeds or concentrator capacities, may produce an infeasible configuration. The method alerts the user that the network is infeasible and identifies those elements that render it so.

This step of the method calculates for each terminal and concentrator the probability that some local access path exists from that device to the backbone based on probabilities of failure assigned to each device and link in the local access network. This availability calculation is given as a traffic-least weighted average of all individual device access probabilities. The method also calculates for each terminal and concentrator the expected delay encountered by a packet of data in traveling from that device to the backbone based on service time and fixed delay associated with each concentrator and local access link. This delay calculation is given as a traffic-weighted average of all individual device expected delays.

Figure 3:
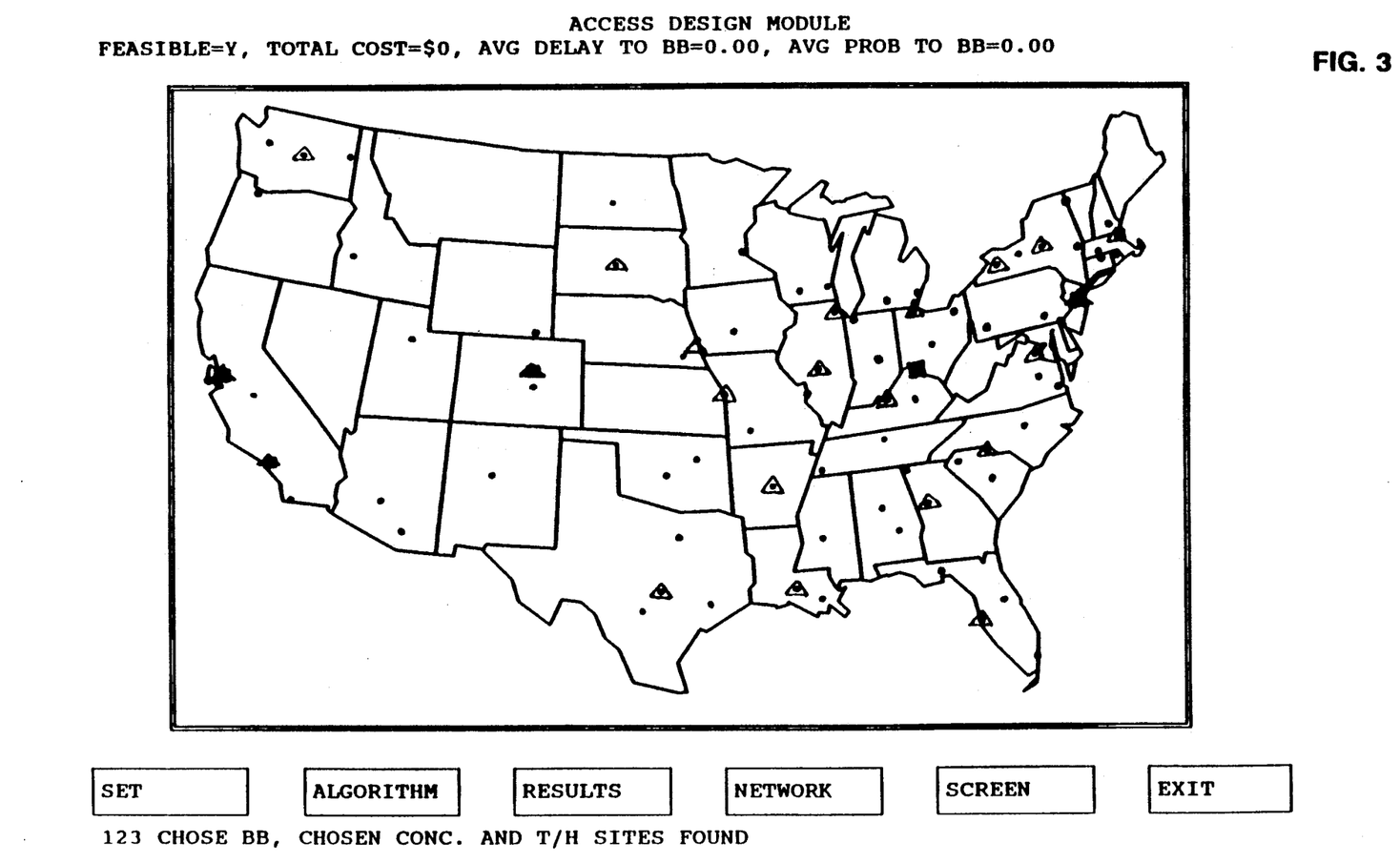
FIG. 3 is a diagram depicting set of backbone nodes, concentrators, and data terminals used as the basis for an example of the method's operation.
Figure 4A:
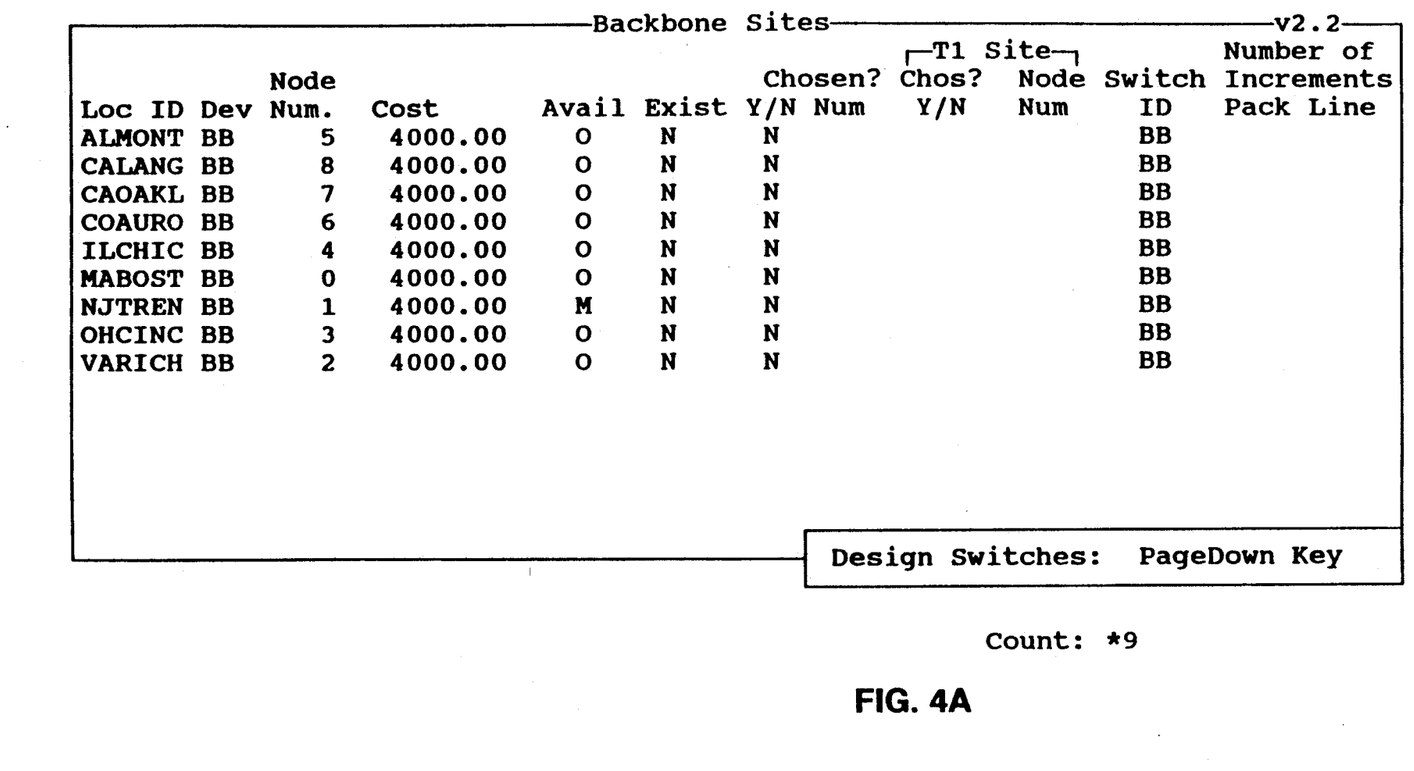
FIG. 4 is a tabular presentation of information about the backbone nodes and concentrators of the network configuration shown in FIG. 3.
Figure 4B:
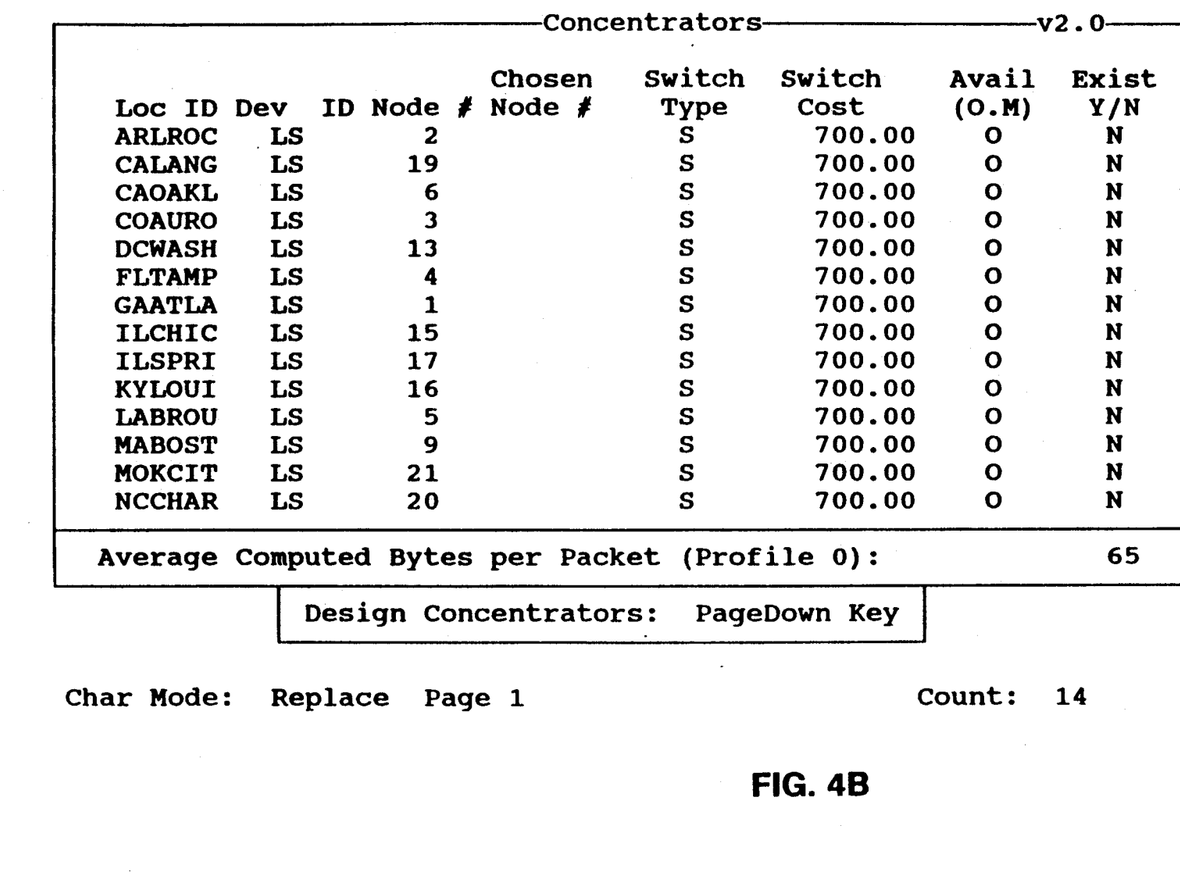
Figure 5:
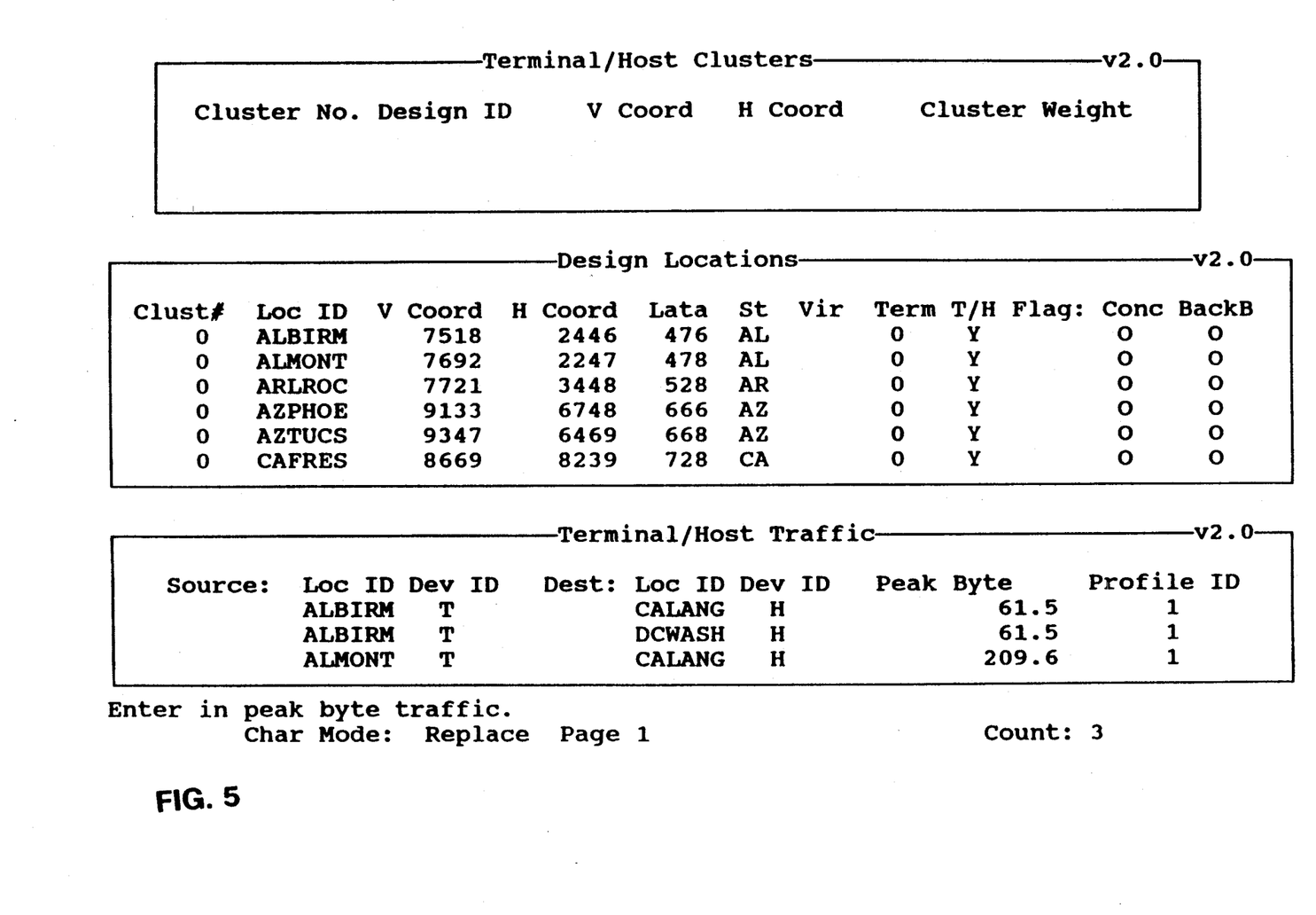
FIG. 5 is a tabular presentation of information about some of the data terminals in the network configuration shown in FIG. 3.

The operation of the method can be illustrated with an example. The example presented here is based on the network configuration shown in FIG. 3. This configuration includes a number of data terminals (shown as solid circles), concentrators (shown as triangles), and backbone nodes (shown as solid squares). Information about the concentrators and backbone nodes of the network shown in FIG. 3 are shown in tabular format in FIG. 4. Information about some of the data terminals of the network shown in FIG. 3 are shown in FIG. 4 and FIG. 5.

Figure 6:
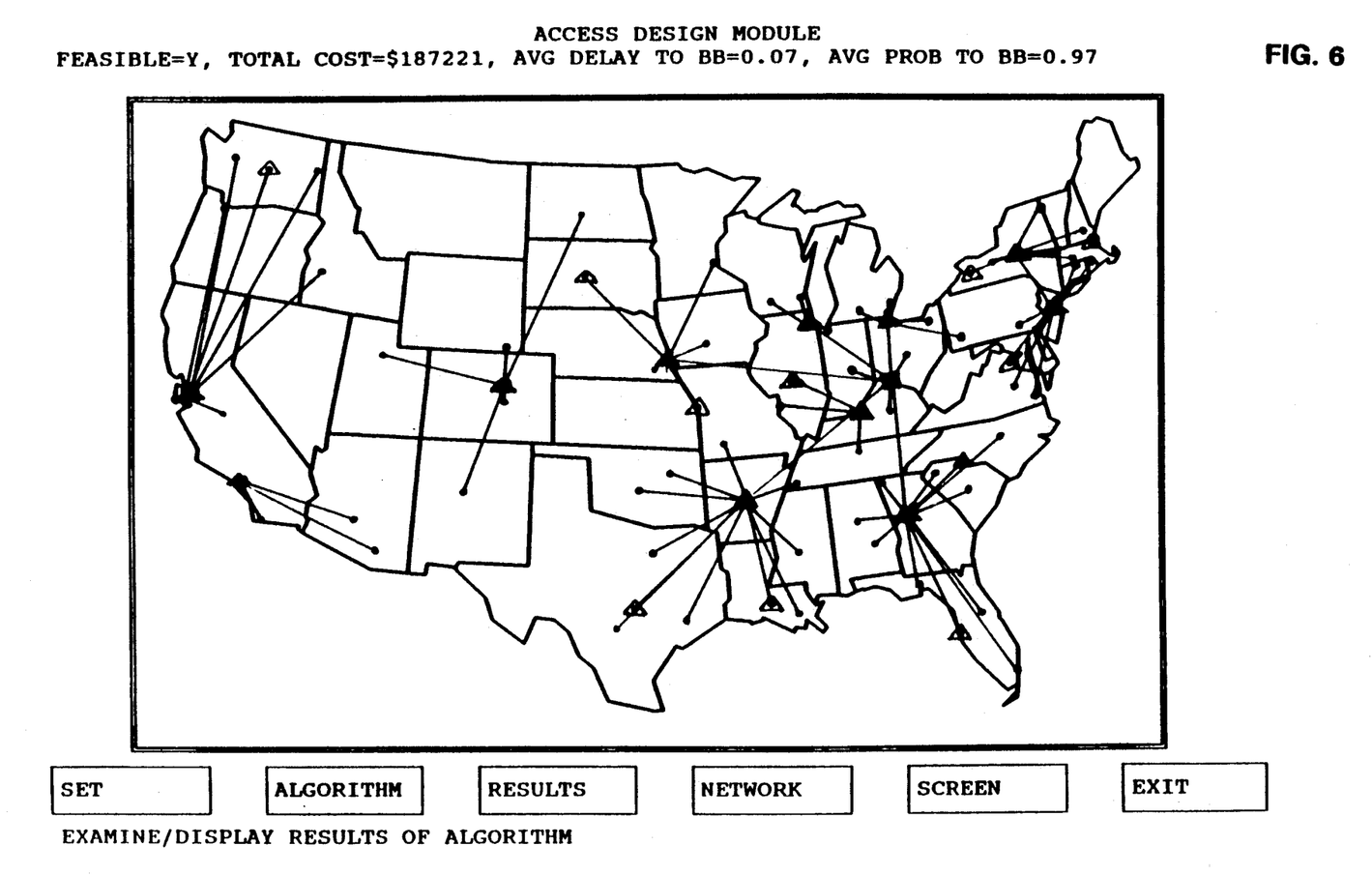
FIG. 6 is a diagram depicting the backbone nodes, concentrators, and data terminals shown in FIG. 3 with the local access links selected by the method interconnecting those elements.
Figure 7:
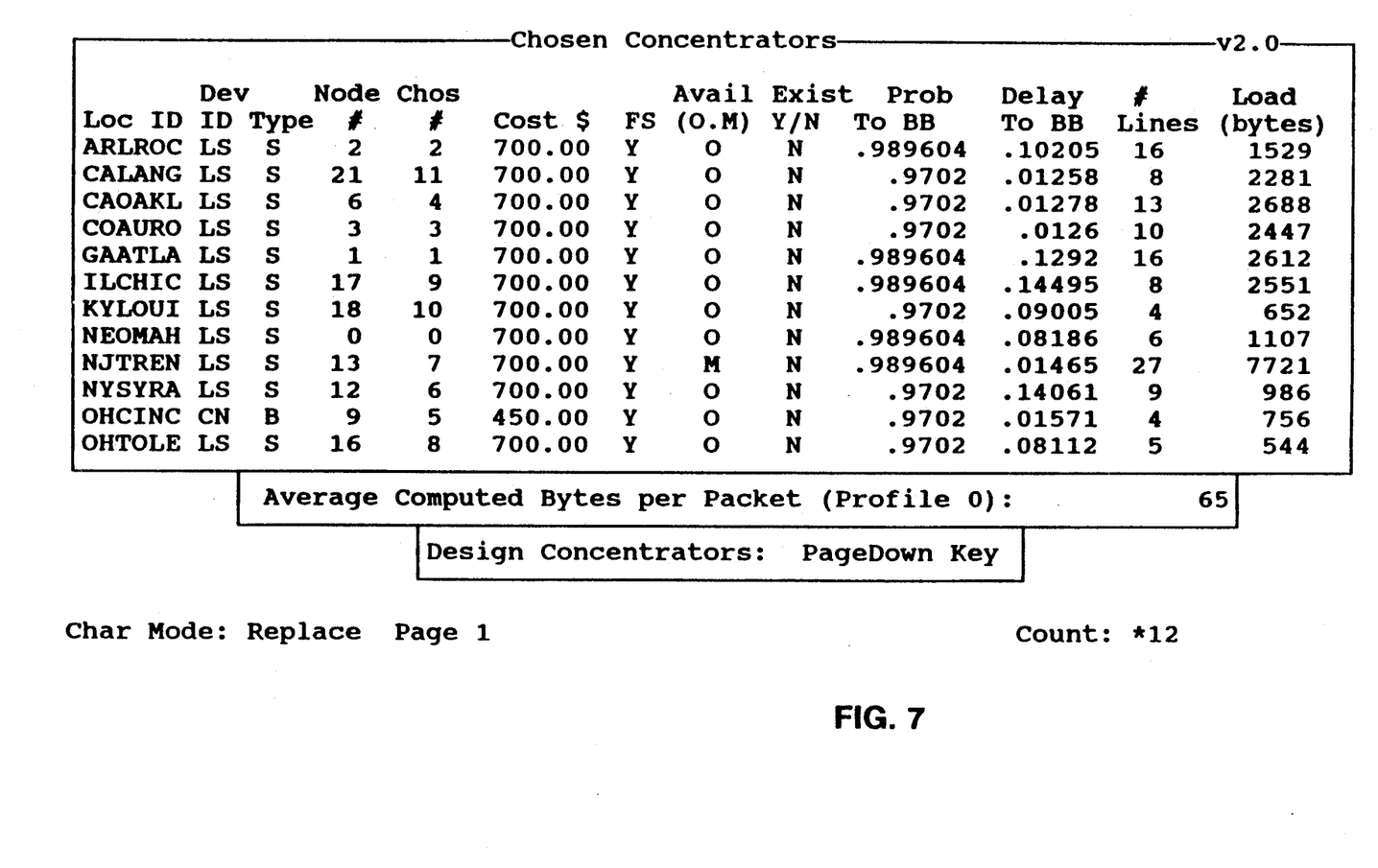
FIG. 7 is a tabular presentation of information about the concentrators in the network topology shown graphically in FIG. 6.
Figure 8:
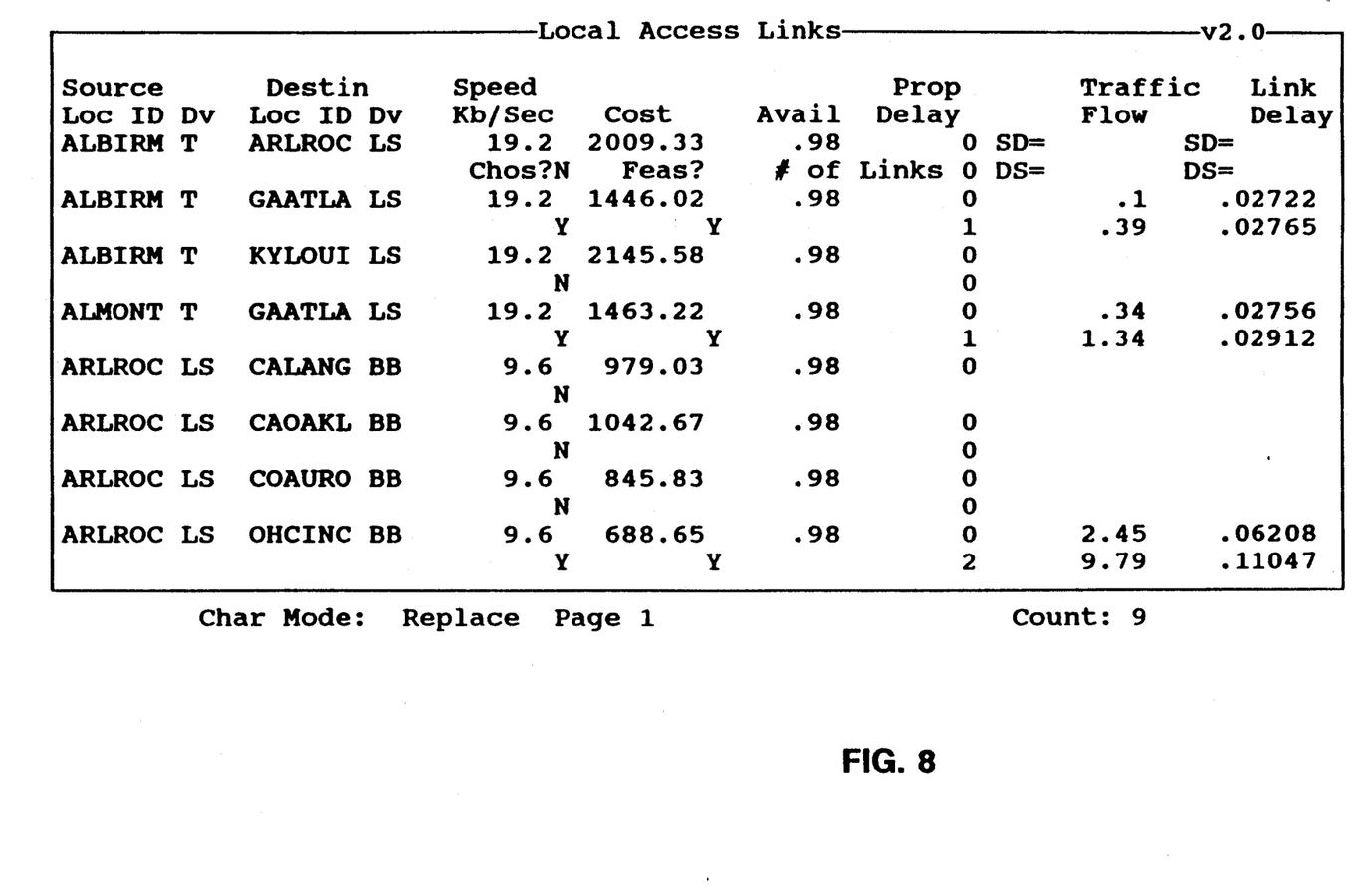
FIG. 8 is a tabular presentation of information about the local access links in the network topology shown graphically in FIG. 6.
Figure 9:
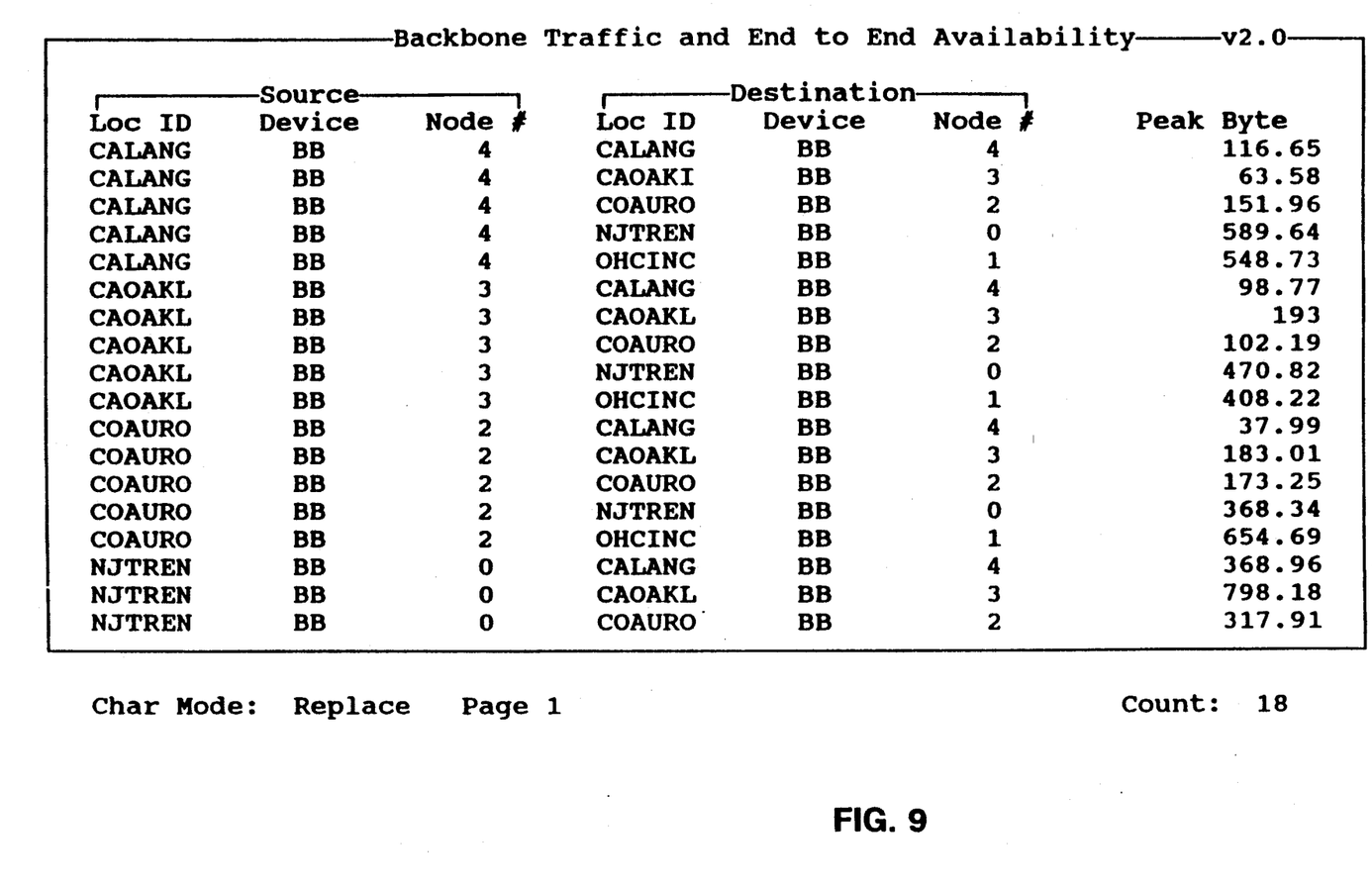
FIG. 9 is a tabular presentation of information about the traffic between backbone nodes in the network topology shown graphically in FIG. 6.

Based on these inputs, the method of the invention configures the local access network shown in FIG. 6. Information about the concentrators chosen for this network is presented in tabular form in FIG. 7. Information about the local access links is presented in FIG. 8, while information about the traffic through the backbone and the availability of traffic routes between backbone nodes is presented in FIG. 9.

The preferred embodiment of the invention described above represents one desirable, workable embodiment of the invention. It is to be understood that the methodology described herein is not limited to specific forms disclosed by way of example and illustration, but may assume other embodiments and methods limited only by the scope of the appended claims and their equivalents.

What is claimed is:

1. A method for constructing a data communication network having a number of terminals comprising:
   i. backbone nodes for routing data traffic within the backbone;
   ii. concentrators connected between said terminals and said backbone nodes; and
   iii. a plurality of links for connecting said terminals with said concentrators;

said method comprising the steps of:
   a. identifying a site for a median concentrator from among a plurality of candidate concentrator sites, said candidate concentrator sites comprising a mandatory concentrator site and an optional concentrator site, which median concentrator is located at that candidate concentrator site to which all of said terminals can be connected by said links at the lowest cost and adding said concentrator to the network;
   b. adding a mandatory concentrator to the network, said mandatory concentrator being a concentrator located at said mandatory concentrator site, and assigning said terminals to said mandatory concentrator so as to minimize the cost of the network;

c. evaluating the effect on the network of adding an optional concentrator at each of said optional concentrator sites to the network, adding that optional concentrator that most reduces the cost of the network, and reassigning terminals to said added optional concentrator so as to minimize the cost of the network; and d. evaluating the effect on the network of removing optional concentrators from the network, removing that optional concentrator whose removal reduces the cost of the network, and reassigning those terminals previously assigned to the that optional concentrator removed from the network to remaining concentrators so as to minimize the cost of the network.

2. The method for constructing a data communication network according to claim 1 further comprising iteratively repeating step (c) and adding each optional concentrator for which the addition the said optional concentrator produces savings in the cost of the network.

3. The method according to claim 1 for constructing a data communication network wherein said concentrators are statistical multiplexers with protocol conversion capabilities.

4. The method according to claim 1 for constructing a data communication network wherein said backbone nodes include data switches.

5. A computer system for constructing a data communication network having a number of terminals comprising:

i. backbone nodes for routing data traffic within the backbone;
   ii. concentrators connected between said terminals and said backbone nodes; and
   iii. a plurality of links for connecting said terminals with said concentrators;

said computer system having:

a. means for identifying a site for a median concentrator from among a plurality of candidate concentrator sites, said candidate concentrator sites comprising a mandatory concentrator site and an optional concentrator site, which median concentrator is located at that candidate concentrator site to which all of said terminals can be connected by said links at the lowest cost and adding said concentrator to the network;

b. means for adding a mandatory concentrator to the network, said mandatory concentrator being a concentrator located at said mandatory concentrator site, and assigning said terminals to said mandatory concentrator so as to minimize the cost of the network;

c. means for evaluating the effect on the network of adding an optional concentrator at each of said optional concentrator sites to the network, adding that optional concentrator that most reduces the cost of the network, and reassigning terminals to said added optional concentrator so as to minimize the cost of the network; and d. means for evaluating the effect on the network of removing optional concentrators from the network, removing that optional concentrator whose removal reduces the cost of the network, and reassigning those terminals previously assigned to the that optional concentrator removed from the network to remaining concentrators so as to minimize the cost of the network.

6. The computer system for constructing a data communication network according to claim 5 wherein said concentrators are statistical multiplexors with protocol conversion capabilities.

7. The computer system for constructing a data communication network according to claim 5 wherein said backbone nodes include data switches.

8. The method for constructing a data communication network according to claim 1 further comprising iteratively repeating step (d) and removing each optional concentrator for which the removal of said optional concentrator produces savings in the cost of the network.

* * * * *